United States Patent Office 2,814,566
Patented Nov. 26, 1957

2,814,566

BORON AND CARBON CONTAINING HARD CEMENTED MATERIALS AND THEIR PRODUCTION

Frank W. Glaser, Lakewood, Ohio, assignor, by mesne assignments, to the United States of America as represented by the Secretary of the Navy No Drawing. Application November 10, 1955,
Serial No. 546,260

7 Claims. (Cl. 106—43)

This invention relates to hard materials or composition of matter, and to the production thereof. The hard materials of the invention are useful for cutting edge elements or cutting points of cutting tools, for dies, for providing wear-resistant surfaces, and for other applications requiring structural material combining strength, hardness, toughness, and resistance to deformation at high temperatures and pressures. This application is a continuation-in-part of the application of Frank W. Glaser for improvements in Boron Containing Hard Cemented Materials and Their Production, Serial No. 170,243, filed June 24, 1950, now abandoned.

Cemented hard metal carbides produced by powder metallurgy technique have long been recognized as the ideal material for applications such as cutting tools, dies, wear-resistant bodies and the like. The best cemented carbide tool material generally embodies as constituents, tungsten carbide, or the combination of tungsten carbide with addition of titanium, columbium, or tantalum carbide, or mixtures of solid solutions thereof, together with an additional cementitious or matrix metal consisting of cobalt, nickel, or alloys of cobalt or nickel.

In making such hard cemented carbide bodies, it was heretofore generally believed that in order to give them desired high mechanical strength it was essential to use as a cementing addition metals which are ductile and which have a considerably lower melting temperature than the carbides.

The present invention is based on the discovery that boron, a substance which lacks ductility, and which has not been considered to be a metal, constitutes an unusually effective addition substance for use in lieu of known ductile cementing metals of relatively low melting point, such as cobalt and nickel in making hard cemented carbides.

As is known, the heretofore available cemented hard carbide materials are subject to what is known as "cratering" or "welding on" caused by heat and pressure, and consisting of chips of cut steel or the like adhering to the tool point strong enough to pull out carbide grains. It has also long been recognized that these deficiencies could be materially reduced by increasing the heat conductivity of such carbide tool material.

More specifically, the present invention is based on the discovery that hard cemented carbides combining known hard metal carbide constituents, with an addition of boron has all the desired characteristics of the best prior cemented hard metal carbides, with the additional advantage of much greater heat conductivity and much greater corrosion resistance, two factors of critical importance in most of the practical applications of cemented carbides.

In general, desirable cemented refractory carbide bodies of the invention may be produced by combining known hard metal carbide particles with an addition of boron in proportions varying from about 2% to 50% of the total composition (throughout the present specification and claims, all proportions are given by weight, unless specifically stated otherwise). However, cemented refractory carbide bodies of the invention having particularly desirable physical characteristics are obtained by confining the proportions of the addition substance to a more limited range, to wit, to from about 10% to 20% of the total composition, the balance being formed of the refractory carbide particles.

Another distinct phase of the present invention is based on the discovery that boron is also an effective addition substance for use in making hard cemented bodies out of fine particles of available silicides, nitrides, and oxides of the metals of the fourth to sixth groups of the periodic system.

Since the electrical conductivity characteristics closely parallel the heat conductivity characteristics of the substance involved, but are more accurately measured, the electrical conductivity, or rather its inverse, the electrical resistivity, will be used as the basis of comparison of the carbides referred to herein throughout the specification and claims. In other words, carbide materials having high heat conductivity have also high electrical conductivity, and vice versa. Thus, by way of comparison, a typical prior art cemented tungsten carbide material has electrical resistivity only about half as high and less, and a correspondingly greater heat conductivity.

Furthermore, cemented carbides material of the present invention, using boron as an addition substance, has a much greater corrosion resistance, in fact greater by a factor of about 20, than the corrosion resistance of prior art cemented carbides using cobalt and/or nickel as a binder addition, the corrosion resistance increasing with increase of the proportion of the boron addition.

It is accordingly an object of the invention to provide hard cemented carbides combining known hard metal carbide particles with boron as an addition substance.

It is also a distinct object of the invention to provide hard cemented materials or compositions combining an addition of boron with particles of silicides, nitrides, and oxides, as well as carbides of the metals of the fourth to sixth group of the periodic system and systems and mixtures thereof.

The present invention is based on the original discovery that—in producing hard cemented refractory material or composition of matter having desirable characteristics superior to those of cemented carbides—the borides of titanium, zirconium, vanadium, columbium, tantalum, molybdenum, tungsten, iron, manganese, chromium, and/or silicon, with or without a further addition of boron, all of which are refractory substances which lack ductility, and have very high melting points compared to cobalt and nickel, constitute highly effective addition substances for use—in lieu of known ductile cementing metals, such as cobalt and nickel, having relatively low melting points.

More particularly, the present invention is based on the discovery that desired cemented refractory bodies may be obtained by combining particles of known carbides of titanium, zirconium, vanadium, columbium, tantalum, molybdenum, tungsten, iron, manganese, chromium, and/or silicon, or mixtures of solid solutions of these carbides, with an addition or additions of particles of borides of titanium, zirconium, vanadium, columbium, tantalum, molybdenum, tungsten, iron, manganese, chromium, and/or silicon, without or with a further addition of boron particles, and that such cemented bodies constitute a system in which its chemical constituents are combined in a unique way responsible for the superior properties of such bodies.

In general, desirable cemented materials of the invention may be made by combining particles of the refractory metal carbide and with a refractory metal boride addition, with or without an addition of boron, into a cemented body system in which carbon constitutes from 0.2% to 25%, boron from 0.5% to 40%, and the metal from 50% to 90% of the body composition. These proportions correspond to a mixture of carbide particles which form 98% to 45% of the total mass, with boride particles which form 2% to 55% of the total mass. If a boron addition, in proportion of 2% to 25% of the total is used, the total of the boron and boride addition should preferably be limited to about 25% of the total mass of the composition.

Cemented bodies having particularly desirable physical characteristics are obtained in accordance with the invention by combining particles of the refractory metal carbide and the refractory metal boride, with or without an addition of boron, into a cemented body system in which carbon constitutes from 3% to 12%, boron from 15% to 35%, and the metal from about 50% to 90% of the body composition. These proportions correspond to a mixture of 95% to 70% of carbide particles with the balance of the boride, without and with the boron addition.

A unique characteristic of the cemented bodies of the present invention is the fact that they exhibit much greater heat conductivity than known cemented refractory carbides, in which the hard refractory carbide particles are cemented by the known ductile cementing metals, such as cobalt and nickel having a relatively low melting point. Since the more readily measured electrical conductivity characteristics closely parallel the heat conductivity characteristics of the substance involved, but are more accurately measured, the electrical conductivity, or rather its inverse, the electrical resistivity, will be used as a basis for comparison of the lower cemented bodies referred to herein throughout the specification and claims. In other words, cemented carbides having high heat conductivity, have also high electrical conductivity, or vice versa. Thus, by way of comparison, whereas typical prior art cemented tungsten carbide material has electrical resistivity of about 100 microhms-cm., in contrast, a typical cemented refractory material of the present invention has electrical resistivity of only about half as high and a correspondingly greater heat conductivity.

X-ray analysis shows that when particles of the carbides referred to above are combined with particles of a metal boride or borides referred to above without any addition of free boron, the application of heat and pressure to the mixture of the carbide and boride particles results in the formation of a cemented body in which the carbide and boride ingredients of the mixture of particles are present in substantially the same proportion as in the original mixture of different powder particles.

On the other hand, X-ray analysis shows when particles of the carbides referred to above are combined with particles of the borides referred to above, together with further addition of unbound or free boron, the application of heat and pressure to the mixture of the carbide, boride and boron particles results in the decomposition of the carbide ingredients and the formation of boride with the carbide-forming substance or substances in proportion to the boron present in the total ingredients of the mass of mixed powder particles. More particularly, X-ray analysis shows that the presence of unbound or free boron in a mixture of carbide particles subjected to pressure and heat results in the decomposition of carbide ingredients and the formation of corresponding borides in proportion to the boron present in the mixture.

Furthermore, cemented bodies of the present invention have a much higher corrosion resistance, in fact, greater by a factor of 10 to 20 than prior art cemented carbides using cobalt and/or nickel as binder additions. The increase in corrosion resistance rises with the increase of the proportion of boron in the composition.

It is accordingly, an object of the invention to provide hard cemented refractory bodies combining particles of known carbides of titanium, zirconium, vanadium, columbium, tantalum, molybdenum, tungsten, iron, manganese, chromium, and/or silicon, or mixtures of solid solutions of these carbides, with an addition or additions of particles of borides of titanium, zirconium, vanadium, columbium, tantalum, molybdenum, tungsten, iron, manganese, chromium, and/or silicon.

A further object of the invention is hard cemented refractory bodies combining particles of known carbides of titanium, zirconium, vanadium, columbium, tantalum, molybdenum, tungsten, iron, manganese, chromium, and/or silicon, or mixtures of solid solutions of these carbides, with an addition or additions of particles of borides of titanium, zirconium, vanadium, columbium, tantalum, molybdenum, tungsten, iron, manganese, chromium, and/or silicon with a further addition of boron, so as to form a cemented particle system of the elemental constituents of the several ingredients, thereby giving the resulting cemented body relatively high heat conductivity and electrical conductivity, and a correspondingly low electrical resistivity.

The foregoing and other objects of the invention will be best understood from the following detailed description of exemplifications thereof.

In producing cemented hard materials of the invention, it is important that the hard refractory particles of the desired carbide, boride, and boron should be comminuted to a great degree of fineness, such as an average particle size of 1 to 2 microns, and that the comminution of the carbide, boride and boron particles should be effected under conditions which prevent oxidation of the particles. If the particles are of a size materially larger than about 3 microns, such as 5 microns or more, the cemented carbide material is somewhat poorer in its physical characteristics. The refractory power ingredients of desired particles size may be produced from a larger size powder, such as −100 mesh to −20 mesh powder, by ball-milling to size under an oxidation suppressing cover of a bath of saturated hydrocarbons, such as mineral oil within an atmosphere of inert gas, such as argon, maintained in the mill spaces under a positive pressure.

It is desirable that all ball-milling should be carried on in a mill having an interior surface or lining and balls of the same composition as an ingredient of the milled particles. If a steel mill and steel balls are used, the ferrous impurities should be removed after the milling by a treatment such as leaching with sulphuric acid diluted with water in concentration between 1:20 to 1:40. Before leaching the ball-milled powder should be cleaned of oil by diluting it and washing with an agent such as ether, acetone, or alcohol, followed by filtering.

The milled powder from which the ferrous particles have been removed is then washed with a volatile agent, such as alcohol or ether, and dried.

The fine dried carbide powder is then mixed with the boron addition to provide a uniform intimate mixture of the metal carbide particles with the boron addition. Since boron is extremely hard, it likewise should be reduced to a fine size such as about 2 microns or less, before it is mixed with the fine hard carbide particles. The boron may be comminuted to size by ball-milling in a manner analogous to the comminution of the carbide particles.

The desired intimate mixture of the carbide particles and the boron addition particles may be secured by subjecting the powder mixture to ball-milling for a sufficient length of time, such as 4 to 100 hours depending on design and dimensions of the ball-mill.

The desired ball-milling to mix is effected in a ball mill under an oxidation suppressing cover, such as a bath of purified mineral oil, and an atmosphere of argon. The oil is then removed from the ball-milled powder mixture, and the fine particle mixture is leached, washed and dried with a volatile agent such as alcohol. The ball-milling operation for reducing the carbide particles and for effecting the mixture of the carbide particles with the addition substance may be carried on within a bath of water, instead of mineral oil, in which case, however, the resulting powder mixture will exhibit poorer properties.

Out of the intimate mixture of fine particles and boron addition particles, the desired cemented material or body is made by compacting and sintering. A very effective way for producing the desired shaped bodies out of such powder mixtures is by hot-pressing the powder mixture at a temperature of from 1200° to 2500° C. with pressures from .5 to 5.0 t. s. i. (tons per square inch). By hot-pressing such powder mixtures with graphite dies, the sintered particles are maintained in an atmosphere consisting predominantly of carbon dioxide, thus preserving them against oxidation. It is believed that for best results, the sintering should be carried on at a temperature at which a liquid phase may be expected, so that the sintering or combined pressing and sintering takes place in the presence of such liquid phase. To simplify the hot-pressing treatment, it may be preceded by cold-pressing the powder mixture in the die, in which it is thereafter hot-pressed.

The graphite dies should not be too hard in order to avoid their cracking. By subjecting the powder mixture to successive compacting and sintering treatment at successively higher temperatures, cemented material of extremely high strength, toughness, density and hardness may be produced. In order to improve the physical characteristics of the hot-pressed cemented refractory body it may be subjected to a similar additional sintering treatment within a protective atmosphere, such as purified hydrogen, or purified cracked ammonia for shorter or longer periods such as about one-half to several hours.

In producing a cemented body out of particles of different carbides, and different borides, with or without the boron addition, the initial or follow-up sintering treatments may be carried on for a sufficient length of time, and at sufficiently high temperatures to cause the different ingredients of the different particles to mutually diffuse, and form solid solutions of the different ingredients, particularly if the sintering is carried on at a temperature at which a liquid phase exists.

Sintered cemented refractory bodies of the invention may also be produced by first cold-pressing the fine powder mixture into a green compact with a pressure from about 1 to about 35 t. s. i., followed by sintering in a non-oxidizing, non-carburizing atmosphere, such as purified hydrogen, or purified cracked ammonia, at a temperature from about 1800° to 2400° C. for about one-half to twelve hours, or more.

The various known refractory hard carbides made by known processes are suitable for cemented refractory compositions of the invention. More specifically, the carbides of titanium, zirconium, columbium, molybdenum, tungsten, tantalum, iron, manganese, chromium and silicon are suitable for combining with a boron addition into a cemented body in accordance with the principles of the invention.

Because of their high heat conductivity, the present invention makes it possible to produce very effective hard refractory cemented carbide compositions with carbides of metals, such as titanium and zirconium, which are available in great abundance, as distinguished from the heretofore generally used cemented tungsten carbides which are relatively difficult to procure. Accordingly, because of their practical significance there will now be described specific examples of the practice of the invention, applied to the production of cemented titanium combined with boron as an addition substance.

A mixture of 85% titanium carbide powder (titanium with 19.3% combined carbon), together with an addition of 15% boron powder was hot-pressed with 3.5 t. s. i. at a temperature of 2400° C. The resulting body had the following characteristics: Modulus of rupture 130,000 to 140,000 p. s. i.; Rockwell A hardness 91; density 4.7 to 4.8 g./cc.; resistivity, 35 to 4 microhms-cm.

A similarly produced body of the same composition and hot-pressed with a pressure of .5 t. s. i., had the following characteristics: Modulus of rupture, 100,000 p. s. i.; Rockwell A hardness, 90; density, 4.6 to 4.7 g./cc.; resistivity, 30 to 35 microhms-cm.

Another body prepared in the same manner with a mixture of 85% titanium carbide powder (titanium combined with 19.3% combined carbon) and 15% cobalt boride hot-pressed with 1.5 t. s. i. at 2250° C. had substantially the same physical characteristics as example containing 15% boron.

As another example, a powder mixture of titanium carbide and 15% boron, was successively hot-pressed with a pressure of 1.5 t. s. i., first at an initial temperature of 1200° C., then re-pressed at 1400° C., and finally pressed at 1920° C., yielding a cemented body of the following characteristics: Modulus of rupture, 145,000 p. s. i., Rockwell A hardness, 91; density, 4.75 g./cc.; resistivity, 20 to 21.5 microhms-cm.

As a further example, a mixture of 90% titanium carbide (with 19.3% combined carbon) and 10% boron was hot-pressed with 3.5 t. s. i. at 2350° C. The resulting body had the following characteristics: Modulus of rupture, 130,000; Rockwell A hardness, 92; density, 4.65 g./cc.; resistivity 50 microhms-cm.

It will be noted that both of the cemented carbide bodies of the invention represented by examples given above has an electrical resistivity not exceeding 50 microhms-cm., as compared to the best of heretofore available cemented carbides, which had a resistivity of the order of 100 microhms-cm., and a correspondingly lower heat conductivity. The unusually high electrical conductivity of bodies of the invention and their correspondingly high heat conductivity, greatly reduces their tendency for "welding on" or "cratering" when used as a cutting tool, and in similar applications requiring a material of high hardness, toughness, and resistance to wear under a great pressure and at high temperature.

Cemented bodies of zirconium carbide and of other known refractory carbides, made with an addition of boron in the same way as the examples described above have improved physical characteristics of the same order.

Furthermore, by similar procedures, fine particles of the silicides, nitrides, and oxides of the metals of the fourth to sixth group of the periodic system may be mixed with an addition of boron in proportions varying from about 5% to 50% of the total body, and formed into cemented bodies of improved physical characteristics.

When a mixture of the refractory carbide particles with the addition of boron powder particles is subjected to the compacting and sintering treatment to produce cemented refractory bodies of the invention, such as represented by the examples given above, liquid phases are formed during sintering at high temperatures, and the resulting cemented body may not actually constitute a composition containing the mixture of the oirginal ingredients out of which it was formed, but rather a system combining the constituents of the refractory carbide particles and the boron addition of the body, bound in a unique way which is effective in giving it its unusual physical characteristics. Thus, by way of example, in case of the cemented refractory body of the invention produced out of a mixture of titanium carbide powder particles and boron powder particles hot-pressed with a pressure of 3.5 t. s. i. at a temperature of 2400° C., it constitutes a system of titanium, carbon and boron in which these constituents are present in proportions corresponding to the mixture of the titanium carbide particles and boron particles out of which such cemented refractory body was formed.

Cemented refractory carbide bodies of the invention having generally desirable characteristics similar to those illustrated by the examples given above, may be made by combining zirconium carbide or other known refractory carbides with the addition or boron in proportions from 5% to 50% of the total composition of the body in the manner described above. Cemented refractory bodies of the invention having particularly desirable characteristics are obtained by confining the addition substance, boron, to a more limited range of proportions, to wit, to from 10% to 20% of the total composition of the cemented refractory carbide body, the balance being formed of refractory carbide particles.

Cemented refractory carbide particles made with known cementing metals such as with 5% to 15% cobalt and/or nickel acquire greatly improved physical characteristics by combining with the ingredients of such bodies 2% to 15% boron by adding and mixing the boron in powder form with the carbide powder particles and the nickel and/or cobalt powder particles prior to compacting and sintering. However, when combining the carbides with the boron addition, as well as with cobalt and/or nickel, the total amount of the addition substance, to wit, nickel and/or cobalt, with from 2% to 15% boron, should not exceed in proportion about 25% of the total composition.

Cemented bodies of zirconium carbide and of other known refractory carbides, made with an addition of boron in the same way as the examples described above, have improved physical characteristics of the same order.

Boron is also a very effective addition substance for use in making hard cemented bodies when mixed with fine particles of known refractory silicides, nitrides, and oxides which are stable at high temperatures of about 1000° C. and higher. Among the silicides suitable for combining with a boron addition into hard cemented bodies of the invention are the silicides of molybdenum, titanium, zirconium, vanadium, chromium and tungsten. Among the nitrides suitable for combining with a boron addition into hard cemented bodies of the invention, are the nitrides of titanium, zirconium, columbium, vanadium, tantalum. Among the oxides suitable for combining with a boron addition into hard cemented bodies of the invention are the oxides of aluminum, titanium, zirconium, tantalum, columbium, magnesium, manganese, vanadium, and silicon.

By way of example, a mixture of fine particles of about 90% molybdenum disilicide with 10% boron, hot pressed with 3.5 t. s. i. at a temperature of 2400° C., yielded a hard cemented body having a density of about 5.8 g./cc., electrical resistivity of about 30 microhms-cm., and other physical characteristics of the same order as the cemented carbide bodies of the examples of the invention given above. As similar cemented body made with 85% molybdenum disilicide, balance boron, had a density of about 5 g./cc., other resistivity of about 40 microhm-cm. and generally similar other characteristics. A similar cemented body made with 80% molybdenum disilicide, balance boron, had a density of about 5 g./cc., a resistivity of 55.5 microhms-cm. and, generally similar other physical characteristics. Such cemented molybdenum disilicide bodies of the invention had also great hot strength at temperatures of 1000° C. and above and exhibited resistance to corrosion within oxidizing atmospheres and combustion gases at high temperatures of 1000° C. and above.

Any of the known procedures for producing refractory borides may be used in providing the refractory borides for cemented refractory metal boride may be produced by heating, as by induction within a graphite crucible, the oxide of the desired metal, together with boron oxide $B_2O_3$ and carbon, to produce the desired refractory metal boride by carbon reduction.

The desired refractory metal boride may also be produced by heating the metal constituent and boron within a crucible under a protective cover which prevents oxidizing, carburizing, or nitriding of the contents. The desired refractory metal boride may also be produced by aluminum thermite reduction of the metal oxide and of boron oxide $B_2O_3$. The desired refractory metal boride may also be produced by electrolysis within a fused salt bath, such as a fused bath composed of alkali or alkaline earth oxides or hydroxides and of alkali and alkaline earth halides, together with a boron compound, such as boron oxide, and the oxide of the desired metal, the boride of which is desired.

The metal borides produced by known procedures have, as a rule, to be purified and separated from the many impurities including the oxide of the metal involved, which has about the same density as the metal boride. By way of example, in order to separate the metal boride particles from the impurities, the boride agglomerate, such as the zirconium boride agglomerate, produced by fused salt electrolysis, is subjected to comminution treatments, whereby it is broken down and comminuted into particles having an average particle size of about −100 mesh, thereby loosening the metal boride particles from the metal oxide particles, and other substances, and making it possible to subject the mass of powder particles to an initial separation treatment.

The comminuted mass of loose particles is first subjected to a gravity separation treatment as by a shaking table which separates that particles having the same density as the boride particles from particles of lower density.

The resulting mass of loose particles, having about the same density as the refractory boride particles, is then leached with hydrochloric acid solution, in concentration of 1:1.5, and then washed with water to remove all traces of acid, yielding a mass of particles of the metal boride and of the metal oxide, the other impurities having been dissolved by the hydrochloric acid.

In the case of borides produced by fused salt electrolysis, the tailings from the shaking table may contain boron oxide, calcium oxide, calcium fluoride, the metal oxide, and also about 1% or less of the metal boride. The tailings may be reused for preparing a mixture for the fused salt bath with proper adjustment for the composition of the tailings. The middlings from the shaking table are re-passed thereover to obtain a further separation between the yield of particles having the same density as the metal boride, and tailings of lower density.

The purified and clean loose powder mass of an average particle size of −100 mesh and about the same density as the metal boride particles, and containing substantially only the metal boride particles and metal oxide particles, is then subjected to a flotation treatment which separates the metal boride particles from the metal oxide particles, yielding, after washing and drying, a body of loose refractory metal boride particles about 98% to 99% pure.

The metal boride powder of 98% to 99% purity is then ball milled to size under a cover of purified mineral oil in an atmosphere of purified argon to reduce the powder particles to an average size of about 2 microns, or in general of the order of 1 to 3 microns. If the ball-milling to size is carried on in a steel ball mill, the ball milled powder particles are subjected to a leaching treatment with very dilute sulphuric acid in a concentration of 1 to 30 for dissolving the iron contents, whereupon the powder is washed with water, followed by washing with alcohol, and drying. Good results are obtained by ball-milling to size with a steel mill.

In general, the same procedure is followed in producing the different refractory metal boride powders, in a form suitable for use in the refractory cemented compositions of the invention by substituting the oxide of the desired other metal for zirconium oxide.

The comminuted fine carbide powder particles, the purified comminuted fine boride particles, with or without the addition of fine boron particles, are then mixed to provide an intimate mixture of the fine particles of the different ingredients having an average particle size of about 2 microns or less. As explained above, the mixing of the particles of the different ingredients is effectively carried out in a ball mill under an oxidation suppressing cover, such as purified mineral oil within an inert atmosphere of argon. The ball-milled mass of the mixed powder ingredients of fine particle size is then cleaned of the oil by filtering, and then leached, washed with alcohol and dried. The resulting mixture of loose minute carbide, boride and boron particles, if the boron ingredient is used, is then ready for the compacting and sintering treatment under heat by which it is formed into a hard refractory structural material or body of the invention having the desired shape.

Specific compositions of matter or structural material exemplifying the invention made by hot-pressing procedure will now be described, although, as explained above, they may also be made by cold-pressing the fine powder mixture into a green compact with a pressure of from 1 to about 35 t. s. i., followed by sintering in a non-oxidizing non-carburizing atmosphere, such as purified hydrogen or purified cracked ammonia, at a temperature in the range from about 1800° to 2400° C. for about one-half to twelve hours.

As an example, a mixture of 45% zirconium carbide powder, 45% zirconium boride powder, and 10% boron powder was hot-pressed with a pressure of 3.5 t. s. i. at 2500° C. The resulting body had a modulus of rupture 80,000 p. s. i.+; Rockwell A hardness 86; density 6.18 g./cc.; electrical resistivity 25 microhms-cm.

Another body prepared in the same manner with a mixture of 50% zirconium carbide powder, and 50% zirconium boride powder had a modulus of rupture 80,000 p. s. i.+; Rockwell A hardness 86; density 6.18 g./cc.; electrical resistivity 25 microhms-cm.

As a further example, a mixture of 50% titanium carbide powder (with about 19.3% combined carbon), together with 50% titanium boride powder, was hot-pressed with a pressure of 3.5 t. s. i. at a temperature of 2400° C. The resulting body had the following characteristics: Modulus of rupture at room temperature 150,000 p. s. i.; Rockwell A hardness more than 92; density 4.70 g./cc.; electrical resistivity 50 microhms-cm. At a temperature of 1200° C. the same body had a modulus of rupture of 105,000 p. s. i.

Another body prepared in the same manner with a mixture of 45% titanium carbide powder, 45% titanium boride powder, and 10 boron powder, had about the same physical characteristics at room temperature, but higher resistivity. At 1200° C. it had a modulus of rupture of 103,000 p. s. i.

As another example, a mixture of 90% titanium carbide powder with 10% cobalt boride powder was hot-pressed with a pressure of 3.5 t. s. i. at a temperature of 2350° C. The resulting body had a modulus of rupture 112,000 p. s. i.; Rockwell A hardness 90; density 5.00 g./cc.; electrical resistivity 60 microhms-cm.

Cemented refractory bodies of the invention of similar desirable physical characteristics may be formed out of mixtures of titanium carbide particles and titanium boride particles, in which either the carbide ingredient or the boride ingredient may vary in proportion between about 2% to 50% of the total composition. Furthermore, cemented refractory bodies of the invention of generally similar charactersitics may be formed of mixtures of titanium carbide particles, titanium boride particles, and an addition of boron particles, in which the boron addition may vary in proportion from about 2% to 25% of the total composition, and in which the carbide and boride ingredients may vary in proportion from 2% to 50% of the balance of the composition. In other words, such cemented refractory bodies of the invention may be made, for instance, with the boron addition ranging from 2% to 25% of the total composition, the balance of the composition being formed of titanium carbide varying from 2% to 98%, and titanium boride varying from 2% to 50% of the balance of the composition. However, where it is desired to obtain such cemented refractory bodies of the invention of superior physical characteristics, the range of variations of the several ingredients should be confined to a more limited range, to wit, the boron addition should be varied only from 2% to 10% of the total composition, and the titanium carbide and titanium boride ingredients should constitute from about one-third to two-thirds of the balance of the composition.

It should be noted that each of the cemented hard bodies of the invention represented by the examples given above has an electrical resistivity not exceeding 60 microhms-cm., as compared with the best heretofore available cemented carbides which has a resistivity of the order of 100 microhms-cm., and a correspondingly lower heat conductivity. The unusually high electrical conductivity of such bodies of the invention, and their correspondingly high heat conductivity, contributes to their great practical value, in applications where they are exposed in operation to high temperatures.

Cemented refractory bodies of the invention of similar desirable physical characteristics may be formed out of mixtures of fine particles of zirconium carbide, titanium boride, and boron, in which the boron ingredient may vary from zero to 25% of the composition, and either the carbide ingredient or the boride ingredient may vary in proportion between about 2% to 98% of the balance of the total composition. In general, it is desirable to include in the mixture of the ingredients at least about 2% of the boron addition. Where it is desired to obtain such cemented refractory bodies of the invention of superior physical characteristics, the variations of the proportions of the several ingredients should be confined to a more limited range, to wit, the boron addition should be varied only from 2% to 10% of the total composition, and the boride or carbide ingredients should vary only from about 33% to 67% of the balance of the composition.

When the mixture of the refractory carbide powder particles and the refractory boride powder particles, with or without the addition of the boron powder particles is subjected to the compacting and sintering treatment to produce cemented refractory bodies of the invention, such as represented by the examples given above, liquid phases are formed during sintering and the resulting cemented body may not actually constitute a composition containing the mixture of the original ingredients out of which it was formed, but rather a system combining the constituents of the carbide and boride ingredients, with or without the boron ingredient, bound in a unique way which is effective in giving the resulting body its unusual physical characteristics.

Thus, by way of example, in the case of cemented refractory bodies of the invention produced out of a mixture of titanium carbide particles, titanium boride particles, with or without the addition of boron, such body constitutes a system of titanium, boron and carbon. Satisfactory bodies of the invention of this type may be produced with the titanium ingredient of the system varying from about 50% to 80%, the carbon ingredient of the system varying from about 0.24% to 20%, and the boron ingredient varying from about 1.5 to 35%. In the case of the superior cemented refractory bodies of the invention formed of titanium carbide, and boron particles varying only over the more limited range, such bodies form a system of titanium, boron and carbon, containing 60% to 70% titanium, 25% to 31% boron, and 5% to 10% carbon.

Similarly, by way of example, in the case of the cemented refractory bodies of the invention produced out of a mixture of zirconium carbide particles, titanium boride particles, with or without the addition of boron, such bodies constitute a system of zirconium, titanium, boron and carbon, in which these different constituents are present in proportions corresponding to the mixture of the different ingredients out of which the cemented refractory bodies are formed.

By procedures generally similar to those described in connection with the specific examples given above, mixtures of fine particles of other refractory carbides named above with the fine particles of the other refractory borides named above and/or iron, with or without the further addition of fine boron particles, may be formed by compacting and sintering into cemented refractory compositions of the invention. In producing such refractory compositions of the invention, the mixture of the different fine particle ingredients, the boron addition may be varied in proportion from zero to 25%, and the proportion of either the carbide ingredient or the boride ingredient may be varied from 2% to 98%. However, as explained above, cemented refractory bodies of the invention of superior characteristics are obtained by confiing the proportions of the several ingredients to a more limited range, namely the boron addition to from 2% to 10% of the composition, and either the carbide or boride ingredient to from one-third to two-thirds of the balance of the composition.

As explained above, one phase of the invention involves the manufacture of hard, strong material by providing a powder mixture of powder particles of a carbide of either titanium, zirconium, molybdenum, tungsten, vanadium, chromium, niobium, tantalum or silicon, or carbides of two or more of those metals, forming 98% to 50% of the powder mixture, powder particles of boron forming 2% to 50% of the powder mixture, compacting the powder mixture and heating the compacted mixture to an elevated temperature between 1200° and 2500° C., at which a liquid phase is formed of the substance of some of the ingredients, which liquid phase contains at least some of the boron, so that upon cooling the heated powder body to a lower temperature, there is formed a solid, hard material wherein the refractory particles of higher melting temperature are bound together by the solidified liquid phase including at least some of the boron content.

Also as explained above, another phase of the invention involves the preparation of a hard cemented body, 75% to 98% of which is formed of the carbide and a boride of either zirconium, titanium, molybdenum, tungsten, vanadium, or chromium, or of a carbide or boride of more than one of these materials, the carbide and boride content of the body comprising 33% to 67% of a carbide of such metals or 67% to 33% of a boride of said metals, the body also containing 2% to 5% of boron in excess of the boron content of its boride ingredient, the carbide and boride ingredients of the body being bound by a solidified liquid phase formed by some of its contents, which solidified liquid phase includes at least some of the boron content of said body. According to the invention, the body is produced out of a powder mixture containing 2% to 98% of a carbide of the foregoing metals, the powder mixture also containing a boride of these metals and an excess of boron beyond the boron of the boride particles, the boride and boron content of the powder mixture constituting 2% to 25% of the powder mixture, this powder mixture being compacted and heated at an elevated temperature between 1200° C. and 2500° C. at which a liquid phase is formed of the substance of some of the particles including some of the boron content thereof, the heating being followed by cooling to a lower temperature at which the liquid phase is solidified for combining the hard refractory particles into a hard solid body.

The novel principles of the invention will suggest various modifications thereof, and it is accordingly desired that the invention shall not be limited to any of the specific exemplifications described herein.

I claim:

1. A hard body consisting of cemented particles, 75% to 98% of the content of said body consisting essentially of a carbide and of a boride of at least one metal selected from the group consisting of titanium, zirconium, molybdenum, tungsten, vanadium, niobium, tantalum, and chromium, said carbide and boride content comprising 33% to 67% of a carbide of one of said metals and 67% to 33% of a boride of one of said metals, said body also containing 2% to 25% of boron in excess of the boron content of its boride ingredient, all proportions being by weight, the carbide and boride ingredients of said body being bound by a solidified liquid phase formed by some of its content.

2. A hard body as claimed in claim 1, said carbide and boride content consisting essentially of a carbide and a boride of the same metal.

3. A hard body as claimed in claim 1, said carbide and boride content consisting essentially of a carbide and a boride of titanium.

4. A hard body as claimed in claim 1, said carbide and boride content consisting essentially of a carbide and a boride of zirconium.

5. A hard body as claimed in claim 1, said carbide and boride content consisting essentially of a carbide and a boride of molybdenum.

6. A hard body as claimed in claim 1, said carbide and boride content consisting essentially of a carbide and a boride of tungsten.

7. A hard body as claimed in claim 1, said carbide and boride content consisting essentially of a carbide and a boride of chromium.

References Cited in the file of this patent

UNITED STATES PATENTS

| | | |
|---|---|---|
| 2,201,150 | Boyer et al. | May 21, 1940 |
| 2,412,373 | Wejnarth | Dec. 10, 1946 |
| 2,438,221 | Kurtz et al. | Mar. 23, 1948 |